Nov. 14, 1961  E. H. HAWLEY ET AL  3,008,382
MACHINE TOOL

Filed Dec. 20, 1957  4 Sheets-Sheet 1

INVENTORS,
Theodore E. Crawford &
Edward H. Hawley
BY
Eran J. Wutschel
Attorney

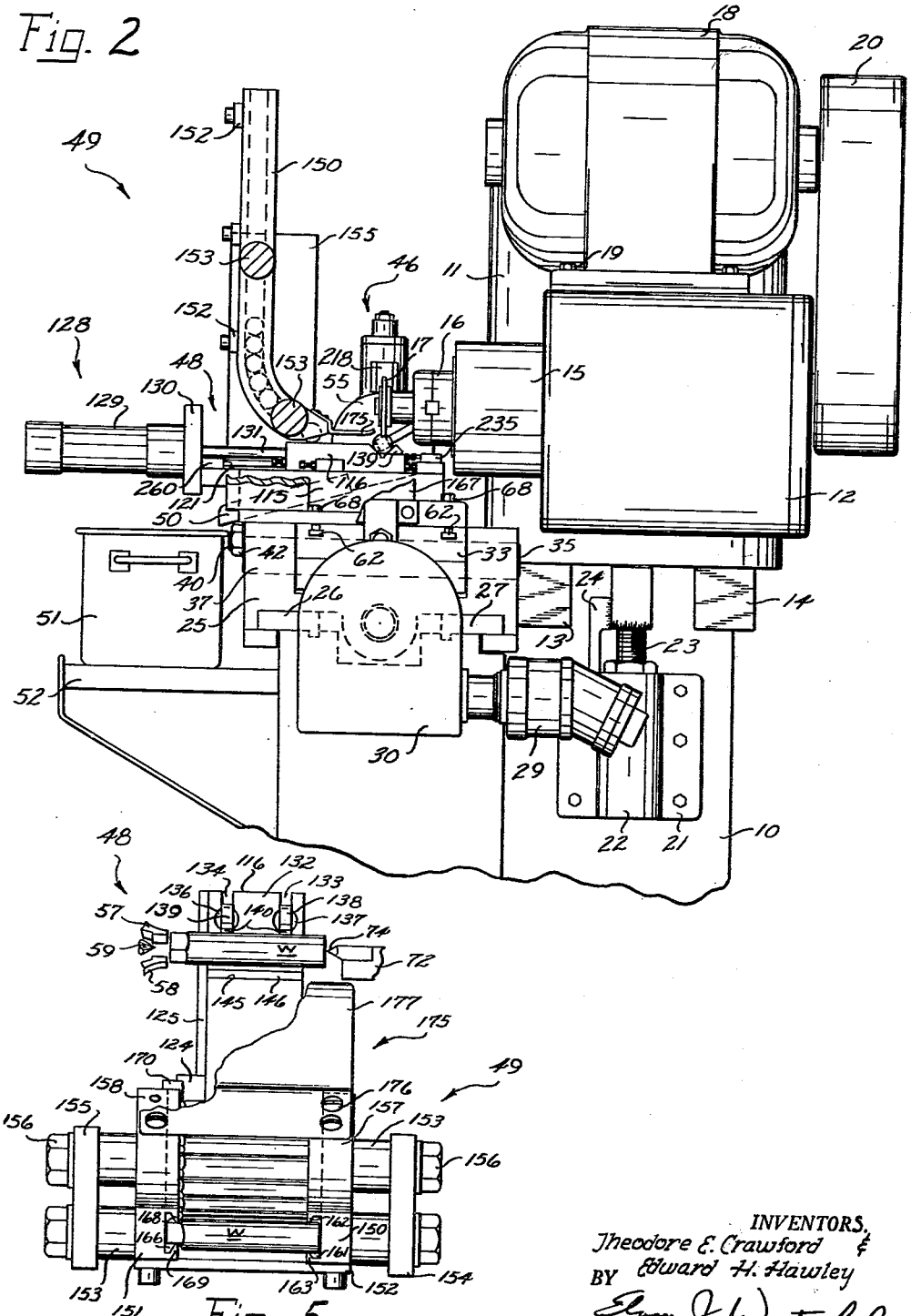

Nov. 14, 1961  E. H. HAWLEY ET AL  3,008,382
MACHINE TOOL
Filed Dec. 20, 1957  4 Sheets-Sheet 3
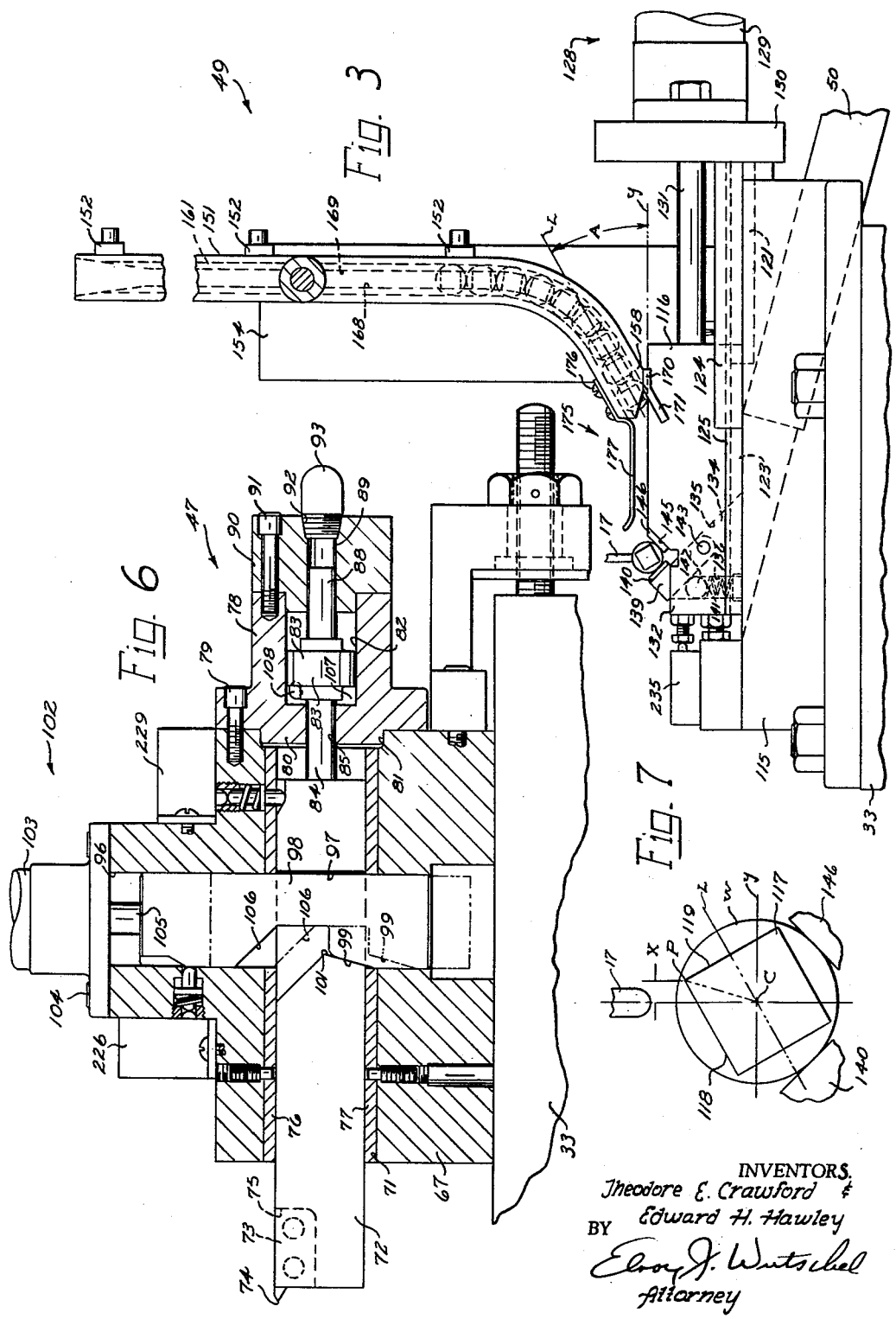
INVENTORS.
Theodore E. Crawford &
Edward H. Hawley
BY
Elroy J. Wutschel
Attorney

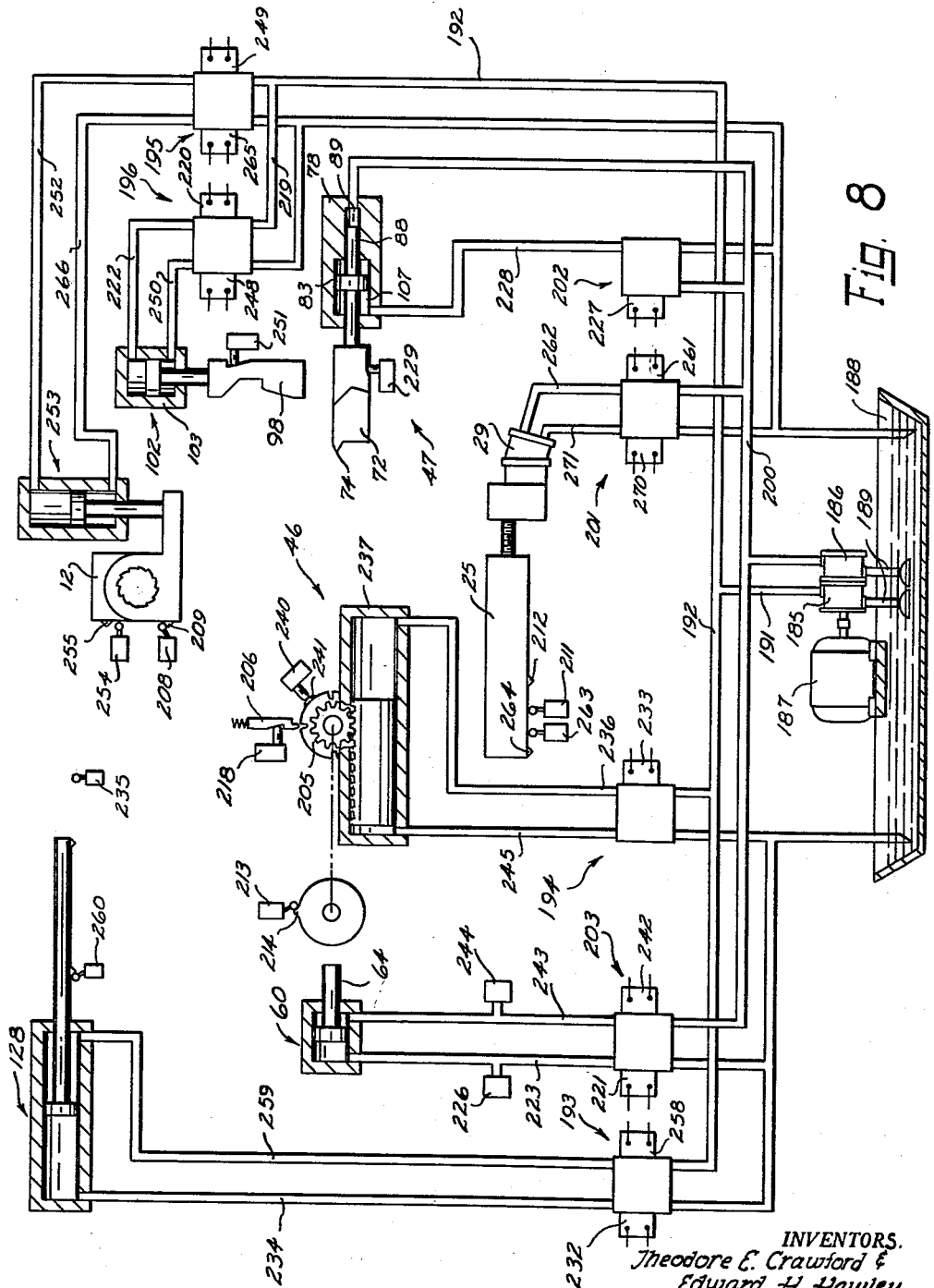

United States Patent Office 3,008,382
Patented Nov. 14, 1961

3,008,382
MACHINE TOOL
Edward H. Hawley, New Berlin, and Theodore E. Crawford, Racine, Wis., assignors to Kearney & Trecker Corporation, West Allis, Wis., a corporation of Wisconsin
Filed Dec. 20, 1957, Ser. No. 704,068
10 Claims. (Cl. 90—15.1)

The invention relates generally to machine tools and more particularly to a machine tool which automatically feeds a tap blank into a work position and operates to square one end of the tap and mill the flutes therein.

In forming the flutes in a tap blank, it has generally been the practice to manually place the tap blank in a work holder and effect a rough milling operation thereupon. The tap blank has been manually indexed for positioning successive surfaces of the blank so that the milling cutter may rough mill a flute in the blank after each indexing movement until the blank is provided with the desired number of flute recesses. After the flutes have been rough milled in the tap blank the blank is manually positioned in a grinding machine for the purpose of grinding the flute recesses to the desired tolerances. In the grinding machine the tap blanks have also been manually indexed. This method of forming the flutes in the tap blanks is both time consuming and expensive. In squaring the ends of the tap blanks it has been the conventional practice to manually load several of the blanks into a fixture which is secured to the worktable of a milling machine. The fixture serves to hold the blanks in position so that the cutter of the machine can, in a single operation, mill one face of the several blanks in a single feeding movement. After one face has been formed the entire fixture is manually repositioned in order that another surface of each of the several blanks is presented to the cutter. Repositioning of the fixture is continued until the four flats have been formed on each of the blanks. This operation is also time consuming and expensive.

It is therefore a general object of this invention to provide an improved machine tool especially adapted to form the flutes or the flats in a tap blank.

Another object of this invention is to provide a machine tool having a tap blank supply hopper or magazine which is capable of feeding the tap blanks to a positioning mechanism in a desired work oriented position.

Another object of this invention is to provide a machine tool having a tap blank positioning mechanism which is automatically operable to present the blank in an oriented work position to a work holding fixture.

Still another object of this invention is to provide a machine tool having a workpiece fixture which is automatically operable to receive and position a workpiece in a desired work oriented position.

Yet another object of this invention is to provide a machine tool which is operable to perform one or the other of two different work operations on a workpiece in a completely automatic cycle of operation.

Another object of this invention is to provide a machine tool especially adapted to form the flutes in a tap blank in a completely automatic cycle.

Another object of this invention is to provide an improved tailstock member which is operable to move a workpiece into an associated chuck mechanism and lightly hold the workpiece in position and is also operable to rigidly hold the workpiece for a work operation.

Still another object of this invention is to provide a machine tool capable of accommodating various sizes of tap blanks.

A further object of this invention is to provide a novel tap blank magazine which feeds the tap blanks to the machine tool in a predetermined desired position.

Another object of this invention is to provide a novel tap blank slide feed mechanism which is operable to receive tap blanks, one at a time, from a magazine in a predetermined position and to advance the blanks to a position so that the tap blank holder may receive the blanks in the same position as oriented by the magazine.

According to this invention, an improved machine tool is provided for milling the flutes in tap blanks and for milling the flats to square an end of the tap blank. The machine tool is provided with a movable table and supports an indexing chuck mechanism along with a cooperating positioning tailstock mechanism in which the tap blanks are held for a work operation which may be either forming the flats to square one end of the tap blank or the forming of the flutes therein after the flats have been formed. In a work operation, to mill the flats on the tap blanks, the indexing chuck mechanism and the tailstock mechanism are positioned on the table in a predetermined position relative to a face milling cutter. The cutter is rotatably supported in an axially adjustable ram mounted in a vertically movable head carried by the machine tool. The tap blanks are loaded into a magazine which is fixedly supported on the machine tool and which is operable to deposit the blanks, one at a time, in a blank receiving recess provided in a blank feed slide. The feed slide is slidably supported on a fixture block that is mounted on the table and is operable to advance the blank into a position between the indexing chuck mechanism and the tailstock mechanism. The center of the tailstock, which is movably supported in the tailstock, is caused to be moved axially by hydraulic pressure into engagement with the end of the tap blank in a manner to move the blank against a center carried by the indexing chuck mechanism, thereby positioning the tap blank and lightly holding the blank between the centers. The jaws of the chuck mechanism are then actuated to clamp the end of the tap blank to the index chuck mechanism and the tailstock center is moved under pressure to effect a clamping engagement of the opposite end of the tap blank. The head is then actuated to position the cutter in a work position and the workpiece positioning slide is retracted. Thereupon, the table is actuated to feed the tap blank to the cutter to mill one flat on the end of the tap blank. When the flat has been milled the table will be retracted and the clamping or lock pressure on the tap blank, exerted by the center of the tailstock, is released to free the tap blank for an indexing movement, while still maintaining a light pressure on the tap blank to maintain it in position between the centers. The indexing chuck is then actuated to index the tap blank ninety degrees to orient it so that another flat may be formed. This cycle of operation is continued until the four flats have been milled, whereupon, after the last operation and after the table is retracted, the center of the tailstock is completely retracted and the jaws of the index chuck open to permit the tap blank to drop into a receiving receptacle. The cycle of operation is completely automatic, initiated by the operator upon actuation of a cycle start switch.

The cycle of operation for milling the flutes in a tap is somewhat similar. In a flute forming operation, the indexing chuck mechanism and the tailstock mechanism are relocated on the table in a desired position relative to a flute milling cutter so that the tap blank will be fed to the cutter in order to successively mill a predetermined number of flutes in the body of the tap blank. In forming the flutes in the tap blank, the flats will have been formed on the tap blank in a previous operation and it is necessary that the flutes be formed in the body of a tap blank at a predetermined desired angular relationship in respect to the flats thereon. Thus, the magazine in which the tap blanks are loaded is of a novel construction in order that the tap blanks may be furnished to the slide with a flat thereof oriented at a required angle in relation to the vertical center line of the cutter. Therefore, a unique angular delivery magazine is employed in lieu of the magazine employed in the work operation of milling the flats on the blank. After the machine tool has been conditioned for a fluting operation, the cycle of operation is similar in general respects as that employed in the milling of the flats. The variation in the cycle of operation being in the number of index movements required in order to mill the required number of flutes which may vary in number from two to five and the retracting and advancing the head after and before every milling operation. The automatic controls for the indexing operation of the index chuck is therefore set so as to provide for the proper number of indexing movements as desired.

This invention consists of the novel construction, combination and arrangement of parts as will be more specifically referred to and as illustrated in the accompanying drawings wherein is shown a particular embodiment of this invention, but it is to be understood that changes, variations and modifications may be resorted to which fall within the scope of the invention as claimed.

FIG. 2 is a view in right side elevation of the machine tool shown in FIG. 1 with the tailstock broken away to more clearly illustrate the tap blank as it is presented to the cutter in a fluting operation and clearly illustrating the angular relationship existing between a flat thereon and the flute milling cutter as it operates upon the tap blank;

FIG. 3 is an enlarged left side elevational view of the tap blank positioning slide and the novel tap blank magazine associated therewith as used in a fluting operation;

FIG. 5 is an enlarged fragmentary plan view of the slide and magazine, showing the association of the indexing chuck jaws and the center thereof and the center of the tailstock mechanism in relationship to a tap blank moved into position by the slide;

FIG. 6 is an enlarged view of the tailstock mechanism partly in vertical section and partly in elevation, showing the arrangement employed for moving the center in a positioning movement and the wedge lock employed to force the center into a clamping action;

FIG. 7 is an enlarged end view of the squared end of a tap blank in relation to a fluting cutter, showing the angular relationship of the cutter and a flat on a tap blank; and, FIG. 8 is a diagrammatic view illustrating the hydraulic circuit.

Figures 1, 4:
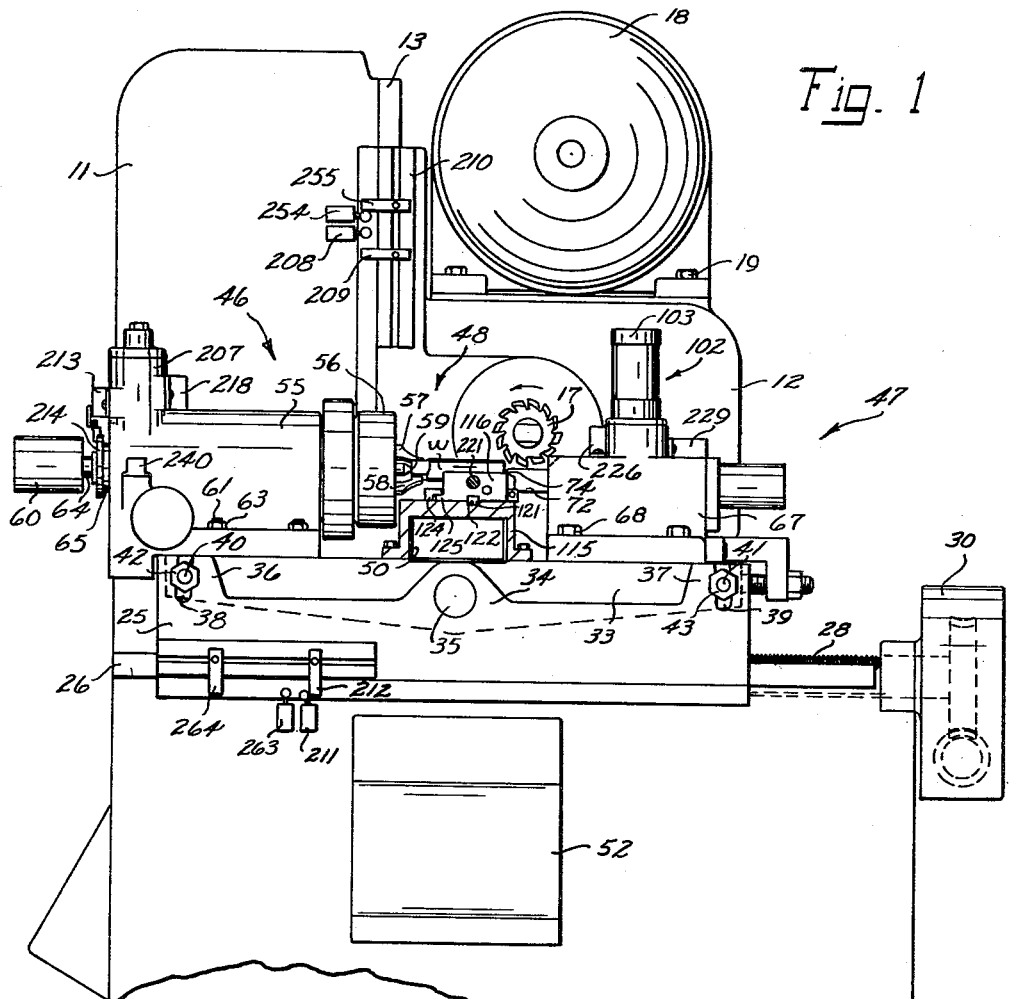
FIGURE 1 is a view in front elevation of a machine tool constructed in accordance with the teachings of the present invention but with the tap blank magazine removed to more clearly show the indexing chuck tailstock and cutter arrangement.
FIG. 4 is an enlarged fragmentary detailed view of the lower end of the magazine depicted in FIG. 3, showing the detailed arrangement of the recess and holding means employed with the slide.

Referring more particularly to the drawings and especially to FIGS. 1 and 2 thereof, the machine tool depicted therein comprises a bed or base 10 having an upstanding column 11. A cutter supporting head 12 is slidably supported for vertical movement on a pair of slideways 13 and 14 provided on the side of the column 11. Movement of the head 12 on the ways 13 and 14 is effected by any well known means, such as a piston and cylinder mechanism. The head 12 supports a ram 15 for axial movement which, in turn, rotatably supports a spindle 16 to which a milling cutter 17 is secured. Power for driving the spindle 16 is derived from an electric motor 18 which is mounted on the top of the head 12 and secured thereto as by bolts 19. The power of the electric motor 18 is transmitted to a gear transmission (not shown) carried within the head and operably connected to rotate the spindle 16, by means of a belt transmission 20. Conventional means, such as a gear and rack mechanism, may be employed to adjust the ram 15 axially.

Since the fluting operation illustrated in the drawings, requires both uniformity and accuracy in the successive cuts, precision positive stop means is provided for setting the work position to which the head 12 may be advanced, so that the extent of head advancement and the depth of each flute form will be identical. The means provided for this adjustment in the present instance comprises a housing 21 which is bolted or otherwise secured to the side of the base 10 directly below the head 12, as shown in FIG. 2. The housing 21 is provided with an elongated vertical boss 22 having a threaded bore. Threadedly engaged in the threaded bore of the boss 22 is a stud 23, the upper end of which is enlarged and disposed to be engaged by the bottom surface of the head 12. A scale 24 carrying suitable indicia is secured to the housing 21 and is arranged to extend upwardly alongside of the enlarged head of the stud 23. Thus, by rotating the stud 23 so as to move it inwardly or outwardly of the boss 22, as the case may be, the exact position to which the head 12 may be lowered is set. If during a production run it becomes necessary to change the cutter 17 the difference in the size of the replacement cutter relative to the size of the replaced cutter can be measured and the stud 23 adjusted accordingly, thereby insuring the same depth of cut for every flute.

A table 25 is slidably mounted on the base 10 on ways 26 and 27 for reciprocatory longitudinal movement which is imparted thereto by means of a rotatable screw 28 journalled in the base 10 and engaged within a nut (not shown) attached to the table 25 in a well known manner. The screw 28 is driven by a hydraulic motor 29 operably connected to the screw 28 through a gear reduction transmission 30 mounted on the side of the bed 10. It is generally accepted practice, in the manufacturing of taps, to provide the flutes thereof with a predetermined runout or slope. To this end, the table 25 is provided with a platform 33 which is mounted thereon for pivotal movement in a vertical plane. To pivotably support the platform 33, the table 25 is provided with a pair of trunnions 34, one of which is shown in FIG. 1, which receives a shaft 35 that passes through a suitable shaft bearing support (not shown) provided on the bottom of the platform 33. The platform 33 is therefore pivotably supported by the trunnions 34 so that either end thereof may be elevated or depressed in respect to the horizontal plane.

In order to lock the platform 33 in any pivotably adjusted position, the table 25 is provided with a pair of upstanding lugs 36 and 37 which are provided with slots or openings 38 and 39, respectively. A pair of studs 40 and 41 are threadedly engaged in the side of the platform 33 and are disposed to extend within the slots 38 and 39, respectively. The extending ends of the studs 40 and 41, each, threadedly receive nuts 42 and 43 by which means the platform may be locked in any adjusted position. By simply loosening the nuts 42 and 43 the platform 33 is free to be pivoted on the shaft 35 and when adjusted to a desired angle the nuts are tightened to lock the platform 33 in the adjusted position.

The apparatus for supporting a tap blank W on the table 25 comprises generally, an indexing chuck mechanism, generally indicated by the reference numeral 46, and a tailstock mechanism, generally indicated by the reference numeral 47. The indexing chuck mechanism 46 and the tailstock mechanism 47 are movably supported on the platform 33 in spaced apart opposed relationship and are operable to receive and hold a tap blank moved into position between them. To position a tap blank W between the indexing chuck mechanism 46 and the tailstock mechanism 47 there is provided a slide block mechanism, generally identified by the reference numeral 48. The slide block mechanism 48 is operable to receive a tap blank from a magazine, generally identified by the reference numeral 49, which is carried on the platform 33 of the table 25. A chute 50 is provided to receive the finished tap from the indexing chuck mechanism 46 upon completion of a work operation. The chute 50 is arranged to direct the finished tap into a container 51 removably supported on a supporting platform 52 mounted on the front of the bed 10.

The apparatus is entirely automatic, except for the loading of the tap blanks into the magazine 49 and the removing of the container 51 by the operator, and is controlled throughout and synchronized by electrical means through the use of limit switches, relays and solenoid operated valves. A completely interlocked electrical control circuit (not shown) is provided to prevent any possibility of operation of the various mechanisms out of the prescribed sequence.

The indexing chuck mechanism 46 is shown in FIG. 1 and comprises a frame or housing 55 in which is contained the indexing mechanism (not shown) which is operably connected to effect rotation of a chuck head 56 rotatably supported at the inner end of the housing 55. The chuck head 56, which is of conventional construction, is provided with a pair of jaws 57 and 58 that are movably mounted in the face of the chuck head 56 and are adapted to move radially therein. The chuck head 56 is provided with a fixed center 59 which operates to center one end of a tap blank W in a predetermined horizontal position.

The chuck head 56 is also arranged for rotary adjustment relative to the housing 55 for the purpose of orienting the jaws in a definite relationship with respect to the cutter 17. Such orientation of the jaws is necessary, in order to retain the squared end of the tap blank W in a desired axial position with respect to the cutter so that the flutes formed in the blank by the cutter will be disposed in a desired relationship with the squared end of the tap in a manner to be more fully described.

A fluid motor 60 is carried on the opposite end of the indexing chuck frame 55 and is operable to actuate a longitudinally extending rod 64 slidably supported within an index shaft 65 rotatably supported in the frame 55. The rod 64 is operably connected to actuate the jaws 57 and 58 in a clamping or unclamping action, in well known manner. The frame 55 of the indexing chuck mechanism 46 is movably secured to the platform 33 of the table 25 by means of a plurality of T-bolts 61 which are engaged in T-slots 62 provided in the platform 33. Thus, longitudinal adjustment of the indexing chuck mechanism 46 may be accomplished by merely loosening the nuts 63 of the bolts 61 and then sliding the frame 55 in either direction as desired.

The tailstock mechanism 47 comprises a housing 67 which is mounted on the tiltable platform 33, being secured thereto by a plurality of T-bolts 68 engaged in the T-slots 62, as shown in FIG. 2. As best seen in FIG. 6, the frame 67 is provided with a horizontally disposed squared bore 71 in which is slidably supported an elongated centering ram 72 which in cross-section presents a square configuration. The outer extending end of the ram 72 receives an insert block 73 having a center point 74. The insert block 73 is secured in a suitable recess 75 provided in the outer top portion of the ram 72. The square bore 71 is provided with four hardened liner plates for slidably supporting the ram 72 within the bore 71, the upper plate 76 and lower plate 77, of which are shown.

The tailstock mechanism 47 serves three purposes, the first of which is to move the tap blank W into the chuck jaws and against the chuck head center 59; secondly, to lightly hold the tap blank W in position between the centers 59 and 74 in a manner that the tap blank W will be held in position but is capable of being rotated in an indexing movement by the chuck head 56; and the third purpose is to effect a clamping force against the tap blank W for a work operation. To effect a movement of the ram 72 axially, a cylinder block 78 is mounted on the end of the housing 67 and is secured thereto by means of screws 79. A boss 80 provided on the inner end of the cylinder block 78 is received within a recess 81 provided in the housing 67 and serves to axially align the block 78 with the axis of the bore 71 and also seals the opening. The cylinder block 78 is provided with a piston chamber 82 in which a piston 83 is reciprocally supported. The piston 83 is provided with a rod 84 that extends through a suitable axial opening 85 provided in the inner end of the block 78 with the rod 84 being operably connected to the ram 72 in a conventional manner.

Hydraulic pressure is employed to actuate the piston 83 and thereby effect movement of the ram 72 in a positioning movement. However, in order to move the ram by the application of fluid pressure to the piston 83, with only sufficient pressure to effect a movement of the tap blank W so as to effect a light holding of the tap blank between the two centers 59 and 74, a novel means has been employed to reduce the effects of the full hydraulic pressure utilized with the machine tool. To this end, a rod or piston 88 of relatively small cross-sectional area is secured to the piston 83 and extends within a bore 89 provided in a cap member 90. The cap member 90 is secured to the cylinder block 78 by cap screws 91, and serves both as a closure for the piston chamber 82 and as an auxiliary piston chamber for the rod 88. The outer end of the bore 89 is provided with an internal threaded portion 92 which receives the threaded end of a hydraulic conduit 93. It is apparent that the ram 72 will be moved with substantially less force when hydraulic pressure is applied to the end of the rod 88 than when the same hydraulic pressure is applied directly to the piston 83. Therefore, when the piston 88 is actuated, the ram 72 will be moved with just sufficient force to move the tap blank W from the position, shown in FIG. 5, toward the chuck head 56 between the jaws 57 and 58 and into engagement with the center 59, as shown in FIG. 1. The force thus applied to the rod 88 will also be sufficient to lightly hold the tap blank W between the centers 59 and 74 without effecting a clamping action thereupon.

The flute milling cutter 17 is rotated in a counter-clockwise direction as viewed in FIG. 1 and operates upon the tap blank W in a climb cutting operation. Thus, the cutter 17 will tend to pull the tap blank W out of the jaws 57 and 58. To prevent the tap blank W from being pulled out of the jaws 57 and 58, since the force on the ram 72 for holding the center 74 in engagement with the end of the tap blank W may not be sufficient to counteract the pulling force of the cutter 17, means have been provided to lock the ram 72 in the extended position. To this end, as shown in FIG. 6, the housing 67 is provided with a vertical bore or opening 96. The ram 72 is also provided with an opening 97 to accommodate a wedge block 98 which is reciprocally contained in the bore 96. The wedge block 98 is provided with a cam or slope surface 99 which is engageable with a complementary sloping surface 101 provided on the ram 72. To reciprocate the wedge block 98 within the bore 96 a fluid actuator 102 is provided. The fluid actuator 102 comprises a cylinder 103 which is secured to the housing 67 with a plurality of cap screws 104 and supports a piston (not shown) for reciprocation therein. The piston (not shown) is provided with a piston rod 105 that extends within the bore 96 and is operably connected to the wedge block 98. Thus, it is apparent that fluid pressure to the cylinder 103 on the rod side of the piston (not shown) will effect a movement of the wedge block 98 upwardly to thereby engage the cam surface 99 thereon with the cam surface 101 of the ram 72 to lock the ram in an extended position. On the other hand, fluid pressure to the cylinder 103 on the head side of the piston (not shown) will lower the wedge block 98 to a position indicated by the broken lines in FIG. 6. The wedge block 98, when lowered to the release position indicated by the broken lines, will align a notch 106 provided therein with the projecting slope or cam surface 101 of the ram to permit rearward movement of the ram 72.

In operation, hydraulic pressure is applied to the end of the rod 88 thereby moving the center point 74 into engagement with the end of the tap blank W to effect an axial movement of the tap blank W into engagement with the center 59 of the chuck head 56. The force applied to move the tap blank W is controlled by the cross-sectional area of the rod 88 and is just sufficient to hold the tap blank W lightly between the centers 59 and 74. After the tap blank W has been positioned, the jaws 57 and 58 are actuated into clamping engagement and the indexing mechanism will index the tap blank W to a first index position. Upon completion of the indexing movement, hydraulic pressure will be supplied to the cylinder 103 to effect movement of the wedge block 98 upwardly thereby exerting a greater force on the end of the tap blank W and to lock the ram 72 in the extended position.

After a flute has been milled in the tap blank W the hydraulic pressure to the cylinder 103 will be directed to effect movement of the wedge block 98 to a release position, indicated by the broken lines in FIG. 6. Upon release of the locking pressure exerted by the wedge block 98, the ram 72 will return to its normal holding position, due to the inherent resiliency of the tap blank W. Thus, the tap blank W will still be maintained rotatably centered between the two centers 59 and 74. This cycle will continue until the desired number of flutes have been milled in the tap blank. After the last flute has been milled in the tap blank and the wedge block 98 has been lowered to its release position, hydraulic pressure will then be directed to a chamber 107 through an orifice or opening 108 provided in the cylinder block 78. Pressure supplied to the chamber 107 will act upon the greater area of the piston 83 overcoming the pressure applied to the end of the rod 88 to effect retraction of the ram 72, thereby withdrawing the center 74 out of engagement with the tap blank W. At the same time that the ram 72 is being retracted, the jaws 57 and 58 are actuated to an unclamped position and the finished tap blank W will drop into the chute 50 to be directed thereby into the container 51.

A novel method of delivering and positioning a tap blank W between the centers 59 and 74 has been provided. The novel method of positioning the tap blanks insures that each tap blank will be presented to the cutter 17 in the same relative position so that the last flute to be milled in each blank will always be oriented in the same position with respect to a flat of the squared end of the blank. In this respect, reference is made to FIG. 7, in which a diagrammatic showing is made of the position in which it is desired that each tap blank be presented to the cutter 17. As shown in FIG. 7, the tap blank W having a square end 117 is illustrated in the position it will be held between the centers 59 and 74.

The tap blank W is delivered and positioned so that a line drawn from the center C of the squared end of the tap blank W through the point P, which is the intersection of the two flat surfaces 118 and 119, will be at a specific angle to a vertical line drawn through the center C. When the tap blank W is thus positioned its axis is located so that it is in the same vertical plane as is the center of the cutter 17 and each blank is accurately located in this same relationship with respect to the cutter. This accurate positioning of the tap blank W is important for the purpose of locating the last flute formed in the tap blank so that this last flute will be disposed in a definite relationship with the squared end of the tap. Assuming that the number of flutes to be milled in the tap blank W is to be three, the indexing chuck mechanism 46 is set for the desired number of indexing movements. With the tap blank W positioned relative to the cutter 17 in the manner illustrated in FIG. 7, the indexing chuck mechanism 46 is actuated in a first indexing movement prior to a cutting operation for the purpose of removing any backlash that may exist in the indexing chuck mechanism 46. The cutter 17 is thereafter brought downward to engage the tap blank W to the desired depth and the table 25 is actuated to feed the tap blank W longitudinally relative to the cutter for milling a flute in the blank. After the flute has been formed in the blank, the cutter 17 is moved upwardly out of engagement with the tap blank, the table 25 is then retracted and the indexing chuck mechanism 46 actuated in another indexing movement to reposition the tap blank for a succeeding fluting cut. This cycle of operation is continued in this manner until the tap blank W is returned to its initial position, illustrated in FIG. 7, and the last flute is then milled in the tap blank.

It is apparent that with the tap blank W positioned in the manner described relative to the cutter 17, the axial center of the last flute will be in a vertical plane passing through the center C and will be offset along the periphery of the tap blank W from the point P by the distance X, so that a radial line drawn from the center C to the center of the last flute will be accurately disposed at a specific angle with respect to a radial line drawn from the center C to the point P.

This relationship for the last flute is always maintained for every tap blank presented to the cutter, regardless of the number of flutes to be milled in a tap blank. While FIG. 7 illustrates a particular relationship between the flutes and the flats of the squared end of the tap, the method and apparatus, to be described, for obtaining this relationship, is equally effective in delivering and positioning a tap blank with respect to the cutter to obtain other relationships between the flute and the flats of the squared end. For example, the blank W may be positioned so that the flute is formed with its axial center in alignment with the point P or offset therefrom at any desired angle.

To deliver and position the tap blank W in a work position in the specific illustrated relationship to the cutter, a hollow supporting block 115 is removably mounted on the platform 33 of the table 25, as shown in FIGS. 1 and 2. The block 115 extends across the table 25 and is disposed between the indexing chuck mechanism 46 and the tailstock 47. A tap blank delivery slide 116 is slidably mounted on the top surface of the supporting block 115 for reciprocation thereon. The slide 116 is guided in its path of travel by a guide 121 secured in an elongated recess 122 provided in the top surface of the supporting block 115 with the guide 121 extending upwardly into a similar elongated recess formed in the bottom of the slide 116 so that it operates to maintain the slide in a rectilinear path of movement. An elongated retainer strip 124 secured to the block 115 cooperates with a flange 125 on the slide to maintain the slide in engagement with the block 115.

A fluid actuator 128 is provided for moving the slide 116 in its path of travel as best shown in FIGS. 2 and 3. The fluid actuator 128 comprises a cylinder 129 which is secured to a mounting bracket 130 that is attached to the supporting block 115, as by welding. The cylinder 129 supports a piston (not shown) therein for reciprocation. The piston (not shown) is provided with a piston rod 131 which extends through a suitable opening in the mounting bracket 130 and is operably connected to the slide 116, in a well known manner.

The forward end 132 of the slide 116 is reduced in height and is provided with a pair of rectangular openings 133 and 134, as shown in FIG. 5, and which extend inwardly into the slide 116 with their back walls being inclined from the vertical to form sloping surfaces 135, one of which is indicated by the broken line in FIG. 3. Vertical bores 136 and 137 are formed in the slide 116 in position to communicate with the openings 134 and 133 respectively. A pair of fingers 138 and 139 are carried within the openings 133 and 134 respectively, each of which is supported in one of the openings for pivotal movement about a pair of pins 143 and is provided with a tap blank engaging pad 140. The fingers 138 and 139 are biased for pivotal movement upwardly and outwardly of their respective openings by springs 141 which are housed within the bores 136 and 137. The springs 141 act against steel balls 142 each of which is disposed to engage the bottom surface of one of the fingers to maintain the fingers in an outward position.

The fingers, when biased outwardly, are limited in their pivotal movement outwardly of the openings 133 and 134 by engaging against the sloping surfaces 135 of their respective openings. A face 145 of the slide opposite the fingers 138 and 139 is provided with an inclined surface to which is removably secured a pad 146. Therefore, when the fingers 138 and 139 are in their upper position as biased by the springs 141, the surfaces of the pads 140 on the fingers and the surface of the pad 146 form a V-shaped pocket for receiving the tap blank W. Thus, as the slide 116 is moved forwardly, a tap blank W within the V-shaped pocket will be carried forwardly by the slide 116 into a position between the centers 59 and 74, and when the tap blank is held therebetween in the manner previously described, the slide 116 may be retracted. Upon retraction of the slide 116 the fingers 138 and 139 will engage the blank W and be pivoted downwardly into the openings 133 and 134 against the force of the springs 141 by the retraction of the slide 116, until the fingers have passed rearwardly of the tap blank W, at which time they will again move upwardly and outwardly of their respective openings by the action of the springs 141.

The tap blank magazine 49 is operably constructed to deliver tap blanks to the slide 116, one at a time, in a predetermined desired position. The magazine 49, as shown in FIGS. 3 and 5, comprises a pair of side frames 150 and 151 which are rigidly united in parallel spaced apart relationship by a plurality of bars or straps 152. The side frames 150 and 151 are each provided with a plurality of bosses 153 which are provided with threaded openings. The magazine is removably secured in an upright position between a pair of supports 154 and 155 that are bolted to the top surface of the supporting block 115 to extend upwardly therefrom. Bolts 156 are inserted through suitable openings in the supports and are threadedly engaged in the threaded openings in the bosses 153 for removably securing the magazine in place. The lower ends 157 and 158 of the side frames 150 and 151, respectively, extend inwardly with a radius of curvature which will permit of smooth sliding movement of a tap blank between the side frames 150 and 151.

The side frame 150 is provided with a guide channel 161 which receives the round ends of the tap blanks. The open side of the guide channel 161 is provided with inwardly facing knife edge guides 162 and 163 that extend along the entire length of the side frame 150 and which are spaced apart just sufficiently to provide a slight clearance for the rounded end of the tap blanks contained therein. This knife edge guide construction presents ample guiding surface while the area of contact is held to a minimum thereby offering minimum frictional resistance to the sliding movement of the blanks. In like manner, the side frame 151 is provided with a guide channel 166, which receives the squared ends of the tap blanks. The open side of the guide channel 166 is also provided with inwardly facing knife edges 168 and 169 that extend along the entire length of the side frame 151 and which are spaced apart just sufficiently to straddle and provide a slight clearance for the sliding passage of the squared end of the tap blank therebetween.

The inwardly or lower extending ends 157 and 158 of the side frames 150 and 151, respectively, have their extreme end portions inclined forwardly in a straight line and extend a distance sufficient to accommodate at least two tap blanks. This straight line portion is disposed at a predetermined angle "A" in respect to a horizontal line "Y" which angle "A" is determined by the spacing it is desired that shall exist between the center of the cutter and the vertical plane in which the point P is located, as shown in FIG. 7. If it is desired that the horizontal distance between the center of the cutter and the point P be increased or decreased, the angle "A" at which the straight line "L" portion of the end 157 and 158 intersects a horizontal line "Y" will be increased or decreased as the case may be.

To insure that the tap blank W will be deposited within the V-shaped receiving pocket of the slide 116, in the predetermined position, the upper guide portions 162 and 168 of the side frames 150 and 151, respectively, at the discharge end, are of a longer length than are the guide portions 163 and 169 of the side frames. Thus, as clearly shown in FIGS. 3 and 4, the flat of the squared end of a tap blank W will be in engagement with the guide portion 168 of the side frame 151 until the entire body of the tap blank clears the lower guide portions 163 and 169, enabling the tap blank to drop into the V-shaped receiving pocket of the slide 116 in a vertical straight line movement, rather than in a rolling or arcuate movement. In this manner, the tendency of the tap blank to rotate as it is discharged from the magazine 49 is effectively counteracted by the extended upper guide portions 162 and 168, and the tap blank will drop into the receiving pocket of the slide 116 in the desired position.

A secondary control is provided to insure that the tap blank is deposited in the receiving pocket of the slide 116 in the predetermined position. To this end, an angular control bracket 170 is secured to the lower end of the side frame 151. The bracket 170 has a leg portion 171 which is inclined downwardly at an angle so that it is disposed parallel to the straight line discharge end portion of the side frame 151 and is of a length sufficiently long to extend downwardly along the side of the slide 116, as clearly shown in FIG. 4. Thus, it is apparent that the tap blank, as it is discharged from the end of the magazine 49, will be maintained in the desired axial position by means of the upper guide portion 168, and as the tap blank drops to the V-shaped receiving pocket of the slide 116 the lowermost flat of the squared end of the tap blank will engage the leg portion 171 of the control bracket 170 to prevent the blank from rolling and thereby maintain it in the axial position.

To insure that the tap blank will be retained within the V-pocket of the slide 116 in the position as deposited, during the advancement of the slide 116, a resilient holding plate 175 is provided. The plate 175 is secured to the side frame members 150 and 151 by screws 176 and has a horizontal extending portion 177 which extends to a position just short of the position that the tap blank occupies when held between the centers 59 and 74. The resilient portion 177 of the holding plate 175 is arranged so that it has light contact with the circumference of a tap blank as it is being advanced by the slide 116 into position between the centers 59 and 74. Thus, positive retention of the tap blank within the V-groove of the slide 116 in the position as received will be insured during the advancing movement of the slide. The contacting engagement of the extending portion 177 of the plate 175 with a tap blank is just sufficient to prevent displacement of the tap blank from the V-groove of the slide 116 but is not sufficient to effect a rolling of the tap blank in the pocket.

All movements of the various movable members and elements thereof are the result of hydraulic pressure being applied to various hydraulic cylinders or motors which actuate the movements. The oil pressure in the circuit is maintained by two pumps 185 and 186 driven by an electric motor 187. The hydraulic circuit will be described with reference to the diagrammatic view in FIG. 8.

An operator, upon starting a cycle of operation, energizes the electric motor 187, driving the pumps 185 and 186 to build up pressure within the circuit. Oil is drawn from an oil reservoir 188 through intake pipes 189 into the pumps 185 and 186 from whence it is pumped into the hydraulic circuit under pressure. The fluid leaves the pump 185 through a line 191 that communicates with a supply line 192 which in turn is connected to a plurality of solenoid actuated directional valves 193, 194, 195 and 196. Meanwhile fluid from the pump 186 is directed into a supply line 200 which is connected to a plurality of solenoid actuated directional valves 201, 202 and 203 and to the bore of chamber 89 in which the rod 88 of the piston 83 is contained. The valves 194 and 202 are of the type which are normally biased to one position and are conditionable to another position upon energization of a solenoid associated therewith. The valves 193, 195, 196, 201 and 203, on the other hand, are of the type which are normally biased to a block condition and are conditionable to two other positions upon selective energization of either one of two solenoids associated with each valve.

In starting a cycle of operation it will be assumed that the machine tool is in an initial condition as follows: the head 12 will be up in a retracted position; the table 25 will be in its retracted position; the indexing chuck mechanism 46 will be in its initial position; a spring biased shot bolt 206, diagrammatically shown in FIG. 8, movably supported within a cylindrical housing 207 illustrated in FIG. 1 and integrally formed with the body 55, is in engagement with an indexing plate 205 depicted in FIG. 8 and constituting a part of the indexing mechanism 46. With the head 12 retracted, a limit switch 208 mounted on the side of the column 11, will be actuated by a cam 209 adjustably secured to a cam rack carrier 210 secured to the head 12. With the table 25 in a retracted position a limit switch 211 mounted on the side of the base 10 will be actuated by a cam 212 adjustably secured to the table 25.

The indexing chuck mechanism 46 when in its initial condition will actuate a limit switch 213 mounted on the housing 55, by means of a cam 214 mounted on the index shaft 65. The index shaft 65, as previously stated, is rotatably supported in the housing 55 and is operably connected to effect indexing rotational movement of the chuck head 56, in a well known manner. The indexing mechanism 46, when in its initial condition will be positioned so as to permit the shot bolt 206 to be biased into engagement with the index plate 205. The shot bolt 206, when thus engaged, will operate to actuate a limit switch 218 mounted on the exterior of the shot bolt housing 207 and having communication with the interior thereof.

With the above condition existing, an operator will depress a cycle start button, of the electrical circuit (not shown) which operates to momentarily energize a solenoid 220 of the valve 196 and a solenoid 221 of the valve 203. Energization of the solenoid 220 serves to condition the valve 196 to permit fluid in the supply line 192 to flow from a branch line 219, through the valve 196 and into a line 222 and be directed thereby into the fluid actuator 102 of the tailstock 47 to effect disengagement of the wedge block 98 with the centering ram 72.

The solenoid 221, when energized, effects a conditioning of the valve 203 to direct fluid from the supply line 200 into a line 223 and thence to the fluid actuator 60 to effect unclamping of the chuck jaws 57 and 58. When the jaws 57 and 58 are fully released pressure in the line 223 will build-up and actuate a pressure switch 226 connected into the line 223. When the pressure switch 226 is actuated it will complete an electrical circuit for energizing a solenoid 227 of the valve 202. Energization of the solenoid 227 operates to open the valve 202 and permit fluid in the line 200 to flow into a line 228 connected to the chamber 107. Fluid flowing into the chamber 107 will act upon the greater area of the piston 83 thereby overcoming to effect of the fluid supplied to the bore 89 and thereby effect retraction of the centering ram 72. The centering ram 72 when fully retracted actuates a limit switch 229, shown in FIG. 6, as being secured to the exterior of the housing 67. The limit switch 229, when actuated, operates to effect energization of a solenoid 232 of the valve 193 and a solenoid 233 of the valve 194.

Energization of the solenoid 232 serves to condition the valve 193 to permit fluid in the line 192 to be directed through the valve into a line 234 and into the actuator 128 of the slide 116 to move the slide for moving a tap blank in the V-shaped pocket into position between the centers 59 and 74. The slide, when fully advanced, will actuate a limit switch 235 to an open condition which then will cause the solenoids 227 and 232 of the valves 202 and 193, respectively, to be de-energized. When the solenoid 227 of the valve 202 is de-energized the valve will be biased to its normal block condition and stop the flow of fluid therethrough. The fluid flowing into the chamber 89 will then act upon the rod 88, since there is now no pressure on the opposite side of the piston 83, to effect movement of the centering ram 72 to engage the center point 74 with the end of the tap blank. The tap blank upon being engaged by the movable center 74 will move axially until its opposite end engages against the center 59 of the indexing chuck mechanism 46 thereby effecting a centering and a light holding of the tap blank between the centers.

Energization of the solenoid 233 of the valve 194 will condition the valve to permit fluid from the line 192 to flow through the valve into a line 236 and thence into a fluid actuator 237 contained within the housing 55, diagrammatically shown in FIG. 8, to effect a resetting of the indexing chuck mechanism 46. In the resetting operation of the indexing chuck mechanism 46, the shot bolt 206 will be moved out of engagement with the index mechanism which then releases the limit switch 218. When the indexing mechanism 46 has been reset a limit switch 240, shown in FIG. 1 as being mounted on the exterior of the shot bolt housing 207 and having communication with the interior thereof, is actuated by a cam 241, diagrammatically shown in FIG. 8.

The centering ram 72, in moving outwardly, will act to release the limit switch 229 which then operates to energize a solenoid 242 of the valve 203. Since the solenoid 221 of the valve 203 has been previously de-energized, energization of the solenoid 242 will operate to condition the valve to block the flow of fluid to the line 223, thereby releasing the pressure switch 226 and direct the fluid from the line 200 into a line 243. Fluid in the line 243 will enter the chuck jaw actuator 60 to actuate the jaws 57 and 58 into clamping engagement with the end of the tap blank located against the center 59. When the chuck 56 is fully clamped, pressure in the line 243 will build-up and actuate a pressure switch 244. The pressure switch 244, when actuated operates to de-energize the solenoid 233 of the valve 194. The valve 194 will thereupon be biased to its normal condition and fluid in the supply line 192 will be directed through the valve into a line 245 and into the index actuator 237 to effect an indexing movement of the tap blank to a first position. As the indexing mechanism 46 is actuated in an indexing movement, the cam 214 will be moved out of engagement with the limit switch 213, releasing the switch. With the limit switch 213 released, the solenoid 221 of the valve 203 cannot be energized so that the clamping action of the jaws cannot be released. When the indexing mechanism 46 reaches its first index position the shot bolt 206 is biased into locking engagement with one of the notches in the index plate 205, and the limit switch 218 will be actuated.

The limit switch 218, upon being actuated, operates at this time, to cause a solenoid 248 of the valve 196 to be energized and a solenoid 249 of the valve 195 to be energized. The solenoid 248, upon being energized, operates to condition the valve 196 to permit fluid from the supply line 192 and the branch line 219 to flow through the valve into a line 250 and into the wedge block actuator 102 to effect engagement of the wedge block 98 with the centering ram 72. The wedge block 98 upon engaging with the centering ram 72 acts, as previously described, to apply a greater force upon the centering ram 72 than does the fluid pressure in the chamber 89 acting upon the rod 88. Thus, the centering ram 72 is caused to move outwardly to exert a clamping force against the end of the tap blank. The wedge block 98 upon being actuated into engagement with the centering ram 72 will actuate a limit switch 251 to partially condition the electrical circuit (not shown) to the solenoids 227 and 233 for subsequent energization.

Energization of the solenoid 249 of the valve 195, through actuation of the limit switch 218, operates to condition the valve to permit fluid in the supply line 192 to flow through the valve into a line 252 and into the top of a fluid actuator 253, diagrammatically shown in FIG. 8, to effect a movement of the head 12 to a work position. The head 12, upon moving to the work position, will effect a release of the limit switch 208, and upon being positioned will actuate a limit switch 254. The limit switch 254 is shown in FIG. 1, as being mounted on the column 11 in position to be actuated by a cam 255 adjustably mounted on the cam rack carrier 210 of the head 12.

The limit switch 251, when actuated, also operates to effect energization of a solenoid 258 of the valve 193. The solenoid 258, when energized, causes the valve thereof to be conditioned to permit fluid in the supply line 192 to flow through the valve into a line 259 and into the slide actuator 128 to retract the slide 116. The slide 116, upon being retracted, will release the limit switch 235 thereby conditioning the electrical circuits (not shown) to the solenoids 227 and 232 for subsequent energization. The slide 116 when fully retracted will actuate a limit switch 260, shown in FIG. 2 as being mounted on top at the end of the block 115, to cause the solenoid 258 of the valve 193 to be de-energized.

The limit switch 254 upon being actuated through the lowering of the head 12 to the work position will cause a solenoid 261 of the valve 201 to become energized. Thereupon, the valve 201 will be conditioned so that fluid in the supply line 200 will flow through the valve into a line 262 and into the fluid motor 29 to actuate the table 25 in an advancing movement to feed the tap blank to the cutter 17 to mill a flute therein. When the table 25 has been fully advanced for forming a flute in the tap blank W, a limit switch 263, shown in FIG. 1 as mounted on the side of the base 10, will be actuated by a cam 264 adjustably mounted on the side of the table 25. Advancement of the table 25 will release the limit switch 211. The limit switch 263, upon being actuated, will operate to effect energization of a solenoid 265 of the valve 195 and the solenoid 220 of the valve 196. The limit switch 263 will also operate, at this time, to effect de-energization of the solenoid 261 of the valve 201, the solenoid 248 of the valve 196 and the solenoid 249 of the valve 195.

The solenoid 220, when energized, operates to condition the valve 196 to permit fluid from the supply line 192 and the branch line 219 to flow through the valve and be directed thereby into the line 222 and thence to the wedge block actuator 102 to move the wedge block 98 out of locking engagement with the centering ram 72. The release of the wedge block 98 acts to release the limit switch 251 to thereby energize the solenoid 233 of the valve 194; and also, acts to de-energize the solenoid 220 of the valve 196. With the solenoid 233 of the valve 194 energized the indexing mechanism 46 will be reset, as previously described. The indexing mechanism 46, upon resetting, will operate to actuate the limit switch 240, as previously described.

The solenoid 265 of the valve 195, energized by the actuation of the limit switch 263, will operate to condition the valve 195 to direct fluid from the supply line 192 into a line 266 and into the head actuator 253 to effect a raising of the head 12. Thereupon, the limit switch 254 will be released, and the limit switch 208 will be actuated. Actuation of the limit switch 208 will cause a solenoid 270 of the valve 201 to be energized to effect a conditioning of the valve to direct fluid from the supply line 200 through the valve into a line 271 and into the fluid motor 29 to effect retraction of the table 25. The retraction of the table 25 will release the limit switch 263 and when fully retracted will actuate the limit switch 211 to effect de-energization of the solenoid 270 of the valve 201 and the solenoid 233 of the valve 194.

With the solenoid 233 of the valve 194 de-energized, the valve is biased to its normal condition to direct fluid from the supply line 192 to the indexing mechanism actuator 237 to cause the workpiece or tap blank to be indexed, as previously described. Upon completion of the indexing movement; the limit switch 240 is released, and when the index position is reached the shot bolt 206 will be biased into one of the notches in the index plate 205 to lock it in position and will also actuate the limit switch 218. Therefore, the solenoid 248 of the valve 196 and the solenoid 249 of the valve 195 will be energized to again lower the head 12 to the work position and to engage the wedge block 98 into locking engagement with the centering ram 72. The head 12 is now positioned to perform another fluting operation on the tap blank and the tap blank is again firmly clamped between the centers 59 and 74 and the cycle will be repeated.

This cycle of operation will be repeated in accordance with the number of indexing movements for which the indexing mechanism 46 is set. When the indexing mechanism is back to its initial position the limit switch 213 will be actuated by the cam 214 indicating 360° of index and the feed cycle will be repeated one more time. However, the actuated limit switch 213 will operate to prevent the solenoid 233 of the valve 194 from being energized, even though the energizing limit switch 251 is released by the withdrawal of the wedge block 98. This will prevent resetting of the indexing chuck mechanism 46 and will maintain the solenoid 233 de-energized until the centering ram 72 is retracted and actuates the limit switch 229, as previously described.

After the final flute has been formed in the tap blank W and the table 25 retracted, as previously described, the limit switch 211 will be actuated. The limit switch 211, when actuated, operates to effect de-energization of the solenoid 242 and energization of the solenoid 221 of the valve 203. Thereupon, fluid in the supply line 200 will be directed to the chuck jaw actuator 60 to effect a release of the clamping action and at this time the pressure switch 244 will be released. When the jaws 57 and 58 are fully released pressure will build-up in the line 223 actuating the pressure switch 226 to effect energization of the solenoid 227 of the valve 202, thereby causing the centering ram 72 to be retracted, as previously described. The pressure switch 226 will also operate to effect de-energization of the solenoid 221 of the valve 203.

The centering ram 72, upon being retracted, will free the tap blank and it will drop into the chute 50 to be conveyed thereby in the receptacle 51. The centering ram 72, when retracted will actuate the limit switch 229 to cause the solenoids 232 and 233 of the valves 193 and 194, respectively, to become energized moving a new tap blank into position between the centers 59 and 74 and the machine will go through another complete cycle of operation.

If the operator wishes to stop the machine after a complete cycle of operation he may depress a cycle stop button (not shown). The stop button is connected so that it will interrupt the circuit to the solenoid 232 of the valve 193 to prevent it from becoming energized, thereby preventing the advancement of a tap blank to the position between the centers 59 and 74.

In a squaring operation the controls will operate in the same manner as in the fluting operation except that the head 12 will be down in a work position at all times thereby maintaining the limit switch 208 released and the limit switch 254 actuated at all times. To maintain the head 12 in a lowered position a selector switch (not shown) is positioned to a squaring cycle position. The selector switch (not shown), thus positioned, maintains the electrical circuit (not shown) to the solenoid 265 of the valve 195 inoperative at all times.

From the foregoing detailed description of an explanation of the machine tool herein set forth as a practical embodiment of the present invention, it will be apparent that there has been provided an improved automatic machine tool capable of receiving a workpiece in a predetermined condition and operable to position and hold the workpiece in the predetermined condition so that it may be fed to a cutter for a series of work operations thereon and which is operable to discharge the finished workpiece into a container without the intervention of the machine operator.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool, a base, a cutter carrying member movably supported on said base, a work supporting table carried by said base for reciprocation towards and away from said cutter carrying member, an indexing member supported by said table for rotational movement in increments, a workpiece receiving chuck carried by said indexing member for rotation therewith and adapted to center and hold one end of a workpiece, a tailstock member mounted on said table for movement with it, a ram carried by said tailstock for axial movement to engage the opposite end of the workpiece, said indexing member and said tailstock member being arranged in spaced apart opposed relationship and cooperative to hold and support a workpiece therebetween with its axis parallel to the direction of table movement, a workpiece positioning member supported on said table for movement with it and for independent transverse movement relative to it, said workpiece position member being provided with a workpiece receiving recess in which a workpiece is carried for advancement into a position between said indexing member and said tailstock member, power means connected to move said ram into engagement with the workpiece positioned between said indexing member and said tailstock member to move the workpiece axially into centered engagement with said indexing member and to lightly hold the workpiece therein, power operated chuck actuating means connected to actuate said chuck to clamp one end of the workpiece therein, ram actuating means carried by said tailstock member and operable to move said ram into tight engagement with the workpiece to thereby secure the workpiece in a desired position for the performance of a work operation thereon, power operated cutter moving means connected to move said cutter carrying member into a work performing position, power operated table actuating means connected to advance said table to feed the workpiece to the cutter of said cutter carrying member, first control means responsive upon completion of advancement of said table to effect reversal of operation of said table actuating means to retract said table, second control means responsive to table retraction to release said ram actuating means for reducing the force of the engagement of said ram with the workpiece without releasing the workpiece, third control means responsive to the release of said ram actuating means to effect an indexing movement of said indexing member so as to reposition the workpiece for another work operation, and fourth control means responsive to 360° of indexing movement to effect disengagement of said ram with the workpiece and a release of said chuck for releasing the workpiece.

2. In a machine for machining a tap from a blank, a base, a cutter head movably supported on said base for vertical positioning, a cutter rotatably supported by said head, a table movably supported on said base in cooperating relationship with said cutter, an indexing chuck member secured to said table, a chuck centering element supported by said indexing chuck member, a plurality of jaws carried by said indexing chuck member for movement radially of said chuck centering element, power means carried by said indexing chuck member and operably connected to actuate said jaws, a tailstock member supported on said table in spaced facing relationship to said indexing chuck member, a tailstock centering element supported by said tailstock member for axial movement, first means connected to move said tailstock centering element axially with a predetermined amount of force, a second means operably connected to exert a predetermined greater force on said axially movable tailstock centering element, a tap blank delivery slide movably supported on said table for advancement to a position between said indexing chuck member and said tailstock member and to a retracted position, a tap blank magazine supported on said table for movement with it and operable to discharge a tap blank to said slide in a predetermined position when said slide is in the retracted position, said slide being operable to prevent a discharge of a tap blank from said tap blank magazine while the slide is displaced from its retracted position, and power means connected to actuate said table in its path of travel, whereby said tap blank magazine will operate to discharge a tap blank to said slide in a predetermined position when said slide is in its retracted position and said slide is actuated to position the tap blank between said tailstock and chuck centering elements and the tailstock centering element is moved axially to engage the end of the tap blank with a predetermined force to thereby move the tap blank into engagement with said chuck centering element and will operate to lightly hold the tap blank therebetween and said jaws may be actuated to clamp the end of the tap blank and said second means is actuated to move the tailstock centering element with a predetermined greater force to effect a clamping action on said tap blank and said table may be actuated to feed the tap blank to said cutter for performing the machining operation.

3. In a machine tool for performing a machining operation on a tap blank and having a base upon which is supported a movable table and a cutter carrying spindle head movable between a retracted position and a work position, a tap blank holding fixture comprising, an indexing chuck member adjustably mounted on the table, a tailstock member adjustably mounted on the table in cooperative spaced relationship to said indexing chuck member, a tap blank delivery slide reciprocally supported on the table and operable to reciprocate between a retracted position and an advanced position for locating a tap blank between said indexing chuck member and said tailstock member, said delivery slide having a tap blank receiving pocket operable to receive and hold a tap blank in a predetermined position, a tap blank magazine carried by the table in position to discharge a tap blank into the pocket of said slide in a predetermined position when said slide is in its retracted position, a movable center mounted in said tailstock member, means in said tailstock member operable to move said center into engagement with an end of a tap blank carried by said slide when said slide is in to hold it therebetween without precluding rotation of the axially so that its opposite end is engaged in said indexing its advanced position to effect movement of the tap blank ing chuck member and to exert a force upon the tap blank tap blank, second means in said tailstock member operable to apply a force to said movable center to effect a clamping of the tap blank between said indexing chuck member and said tailstock member, means carried by said indexing chuck member operably connected to actuate said indexing chuck member for effecting a chucking of the tap blank to said indexing chuck member, and power means connected to actuate said table to feed the tap blank relative to the cutter for performing a machining operation.

4. In an automatic machine tool, the combination with a base, a cutter carrying spindle rotatably mounted on the base for movement from a retracted position to a work position, and a table movably mounted on the base in cooperating relationship with the cutter carrying spindle, of an indexing chuck fixture carried by the table and adapted to receive and hold one end of a workpiece, a tailstock fixture mounted on the table in spaced cooperating relationship with said indexing chuck fixture, a centering ram movably supported by said tailstock fixture for axial movement toward and away from said indexing chuck fixture, a workpiece position slide having a workpiece receiving pocket adapted to receive and hold a workpiece in a predetermined position as received, said slide being supported on the table for movement between a workpiece receiving position and a workpiece delivery position wherein a workpiece in the pocket of said slide will be positioned between said fixtures, power means carried by the table and operably connected to move said slide in its path of travel, centering ram power means carried by said tailstock fixture and operably connected to move said centering ram axially into engagement with an end of a workpiece positioned between said fixture by said slide and operable to move the workpiece axially so that the opposite end of the workpiece is moved into position in said indexing chuck fixture, said centering ram power means being also operable to exert a relatively light holding pressure on said centering ram wherein said centering ram will act to lightly hold the workpiece between said indexing chuck fixture and said centering ram, a workpiece magazine carried by the base in position to discharge a workpiece into the pocket of said slide when said slide is in a workpiece receiving position, guide means in said magazine to position a workpiece in a predetermined position with respect to its own axis and operable to maintain the workpiece in such predetermined position as the workpiece is discharge into the pocket of said slide, power operated clamping means carried by said indexing chuck fixture and operably connected to effect a clamping of the end of the workpiece within said indexing chuck fixture thereto, power operated indexing, means carried by said indexing chuck fixture operably connected to actuate said indexing chuck fixture in an indexing operation for indexing the workpiece clamped to it while said centering ram is applying a relative light holding pressure on the opposite end of the workpiece, a locking element carried by said tailstock engageable with said centering ram and operable when engaged therewith to apply a relatively greater axial force on said centering ram for applying an axial clamping force on the end of the workpiece to firmly secure it in position for the performance of a work operation, and power operated locking element actuating means carried by said tailstock fixture and operably connected to actuate said locking element.

5. In an automatic milling machine having a base, a cutter carrying spindle supported on said base for movement from a retracted position to a work position, a work supporting table slidably mounted on said base in position to cooperate with said cutter carrying spindle when in a work position, an indexing chuck fixture supported on said table, a tailstock fixture supported on said table in spaced cooperating relationship with said index chuck fixture, a workpiece positioning slide slidably mounted on said table for movement between a retracted workpiece receiving position and an advanced position for locating a workpiece between said fixtures to perform a machining operation thereon, said slide being provided with a workpiece receiving pocket adapted to receive and maintain a workpiece in a predetermined position as received, a workpiece magazine carried on said table in position to deposit a workpiece in the pocket of said slide when said slide is in its retracted position, guide means in said magazine operably arranged to position a workpiece to a predetermined position of orientation about its own axis relative to the vertical center line of the cutter of said cutter carrying spindle, said guide means being constructed and arranged to maintain a workpiece in such predetermined position of orientation until the workpiece is deposited in the pocket of said slide, resilient means secured to said magazine and extending forward toward said fixtures to a point short thereof, said resilient means being operable to maintain a slight peripheral engagement with a workpiece in said pocket of said slide to prevent displacement of the tap blank during the advancing of said slide, and power means supported by said table and operably connected to actuate said slide in its path of travel between its retracted and advanced positions.

6. In a machine tool for performing work operations on a tap blank having a base upon which is supported a cutter carrying spindle head and a reciprocal table adapted to move toward the cutter of the cutter carrying spindle head or away from it for performing a machining operation on the tap blank, an indexing chuck member mounted on the table and adapted to receive and hold one end of a tap blank, means to actuate said indexing chuck member in a clamping action for securing a tap blank to it, a tailstock member mounted on the table in spaced relationship to said indexing chuck member, a tap blank engaging element movably supported by said tailstock member for axial movement, a tap blank delivery slide having a tap blank receiving pocket operable to receive and hold a tap blank in a predetermined position, said delivery slide being reciprocally supported on the table for movement between a retracted position and a delivery position wherein a tap blank in its pocket will be positioned between said indexing chuck member and said tap blank engaging element, a tap blank magazine carried by the base in position to discharge a tap blank into the pocket of said delivery slide in a predetermined position when said slide is in its retracted position, means connected to actuate said tap blank engaging element when said delivery slide is in its delivery position for engaging the end of a tap blank in the pocket of said delivery slide to move the tap blank into said indexing chuck member and exert a light axial pressure upon the tap blank for holding it in position, means connected to actuate said indexing chuck member in an indexing operation for indexing the tap blank secured to it while a light axial pressure is applied to the tap blank by said tap engaging element, and means connected to actuate said tap blank engaging element with a relatively heavy pressure for applying an axial clamping pressure to the end of the tap blank to firmly secure it for the performance of a machining operation upon it.

7. In a machine tool for operating upon a tap blank provided with flats on one end thereof having a base, a cutter carrying spindle rotatably supported by said base, a cutter secured to said spindle, a table slidably mounted on said base in cooperating relationship with said cutter, fixture means operably mounted on said table to receive and hold a tap blank in a position so that the axis of the tap blank is disposed transverse to the axis of said cutter in combination with, a tap blank loading slide mounted on said table for movement between a retracted position and an advanced placement position in which the tap blank is located for performing a machining operation thereon, said slide being provided with a recess to receive and support a tap blank therein, a tap blank feeder magazine mounted on said table and having a discharge end, said magazine being disposed on said table in position so that the discharge end thereof is disposed above the recess in said slide when said slide is in its retracted position, guide means along at least one side of said magazine, said guide means comprising a pair of parallel spaced rails arranged to receive the end of the tap blank having the flats thereon and operable to permit free movement of the tap blank through said magazine in a sliding guided movement, said magazine having the discharge end thereof including the adjacent ends of said guide rails disposed at an angle relative to the vertical center line of the cutter to thereby position a tap blank for discharge therefrom in a manner so that one flat of the tap blank is predeterminedly angularly orientated in respect to the vertical center line of the cutter, said guide rails being constructed and arranged in a manner so that the uppermost one of said rails at the discharge end of said magazine extends beyond the lowermost one of said rails for a distance to maintain engagement with the uppermost flat of the tap blank being discharged until the said tap blank is free and clear of said magazine to thereby maintain the tap blank in the predetermined oriented condition so that the tap blank may be deposited in the recess of said slide in the predetermined oriented position, and power means carried on said table and operably connected to actuate said slide in its path of travel between the retracted and advanced position.

8. In a machine tool for operating upon a tap blank provided with flats on one end thereof having a base, a spindle rotatably supported on said base, a cutter on said spindle, a table slidably mounted on said base in cooperating relationship with the said cutter carrying spindle, and fixture means on said table operable to receive and hold a tap blank in a position so that the axis of the tap blank is disposed transverse to the axis of the cutter, the combination of, a tap blank loading slide mounted on said table for movement between a retracted position and an advanced placement position in which it locates a tap blank for performing a machining operation thereon, said slide being provided with a tap blank receiving pocket, the pocket presenting in cross-section a V-shaped configuration and constructed and arranged so that one side thereof is constituted by a sloping surface of said slide, at least one movable element yieldably maintained in a position to constitute the opposite side of the said pocket, a tap blank feeder magazine mounted on said table and having a discharge end, said magazine being disposed on said table in a position so that the discharge end thereof is positioned above the pocket in said slide when said slide is in a retracted position, said magazine having guide means along at least one side thereof, said guide means comprising, a pair of parallel spaced rails arranged to engage the ends of the tap blanks having the flats thereon for guiding the tap blanks while permitting free movement of the tap blanks through said magazine in a sliding guided movement, said magazine having the discharge end thereof including the adjacent ends of said guide rails disposed in predetermined angular relationship to the vertical center line of the cutter carried by the spindle whereby a tap blank discharged from said magazine will have one flat thereof predeterminedly angularly orientated in respect to the vertical center line of the cutter of said cutter carrying spindle, said guide rails being constructed and arranged in a manner so that the uppermost one of said rails at the discharge end of said magazine extends beyond the lowermost one of said rails for a distance to maintain engagement with the uppermost flat of the tap blank being discharged until the tap blank is free and clear of said magazine to thereby maintain the tap blank in the predetermined oriented condition so that the tap blank will be deposited in the pocket of said slide in the predetermined oriented condition, a guide plate secured to said magazine in position to extend downwardly along the side of said slide and disposed parallel to the end of the uppermost one of said rails adjacent the discharge end of said magazine, said guide plate being operable to receive the lowermost flat of the tap blank to insure that a tap blank deposited in the pocket of said slide will be in the same oriented position as discharged from said magazine, resilient means secured to said magazine and extending parallel to the direction of advancement of said slide to a point short of said fixture means and operable to maintain the tap blank within the pocket of said slide in the predetermined deposited position during the advancement of said slide, and power means carried by the table and operably connected to actuate said slide in its path of travel between its retracted and advanced positions.

9. In a machine tool for performing a machining operation on a workpiece, a base, a work supporting table slidably mounted on said base, a cutter carrying spindle rotatably supported by said base with the cutter in position to operate upon a workpiece carried by said table, an indexing chuck member mounted on said table, a tailstock member mounted on said table in cooperative spaced relationship with said indexing chuck member, a movable center mounted in said tailstock member, means carried by said tailstock member to move said center axially into relatively light engagement with a workpiece placed between said center and said indexing chuck member to hold the workpiece therebetween for rotational movement about its axis in response to the operation of said indexing chuck member, means carried by said indexing chuck member to actuate said indexing chuck member for effecting a chucking of the workpiece to said indexing chuck member, clamping means carried by said tailstock member to apply a relatively heavy axial force to said movable center for effecting a clamping of the workpiece between said indexing chuck member and said tailstock, and power means connected to actuate said table to feed the workpiece relative to the cutter for performing a machining operation.

10. In a machine tool for performing a machining operation on a workpiece, a base, a work supporting table slidably mounted on said base, a cutter carrying spindle rotatably supported by said base, an indexing chuck member mounted on said table, a tailstock member mounted on said table in cooperative spaced relationship with said indexing chuck member, workpiece positioning means operably connected to position a workpiece between said indexing chuck member and said tailstock member at a predetermined angle of rotation about its own axis, a movable center mounted in said tailstock member, means carried by said tailstock member to move said center into relatively light engagement with a workpiece placed between said center and said indexing chuck member to hold the workpiece therebetween for rotational movement about its axis in response to the operation of said indexing chuck member, means carried by said indexing chuck member to actuate said indexing chuck member for effecting a chucking of the workpiece to said indexing chuck member, clamping means carried by said tailstock member to apply a relatively heavy axial force to said movable center for effecting a clamping of the workpiece between said indexing chuck member and said tailstock, and power means connected to actuate said table to feed the workpiece relative to the cutter for performing a machining operation.

References Cited in the file of this patent

UNITED STATES PATENTS

| | | |
|---|---|---|
| 379,307 | Codling | Mar. 13, 1888 |
| 1,252,928 | Miller | Jan. 8, 1918 |
| 1,477,179 | Ducer | Dec. 11, 1923 |
| 1,911,574 | Karle | May 30, 1933 |
| 2,242,978 | Moen | May 20, 1941 |
| 2,251,034 | Bryant | July 29, 1941 |
| 2,740,236 | Flyvare et al. | Apr. 3, 1956 |
| 2,746,218 | Bowie et al. | May 22, 1956 |

UNITED STATES PATENT OFFICE
CERTIFICATE OF CORRECTION

Patent No. 3,008,384                                November 14, 196

Chester J. Pierce, Jr.

It is hereby certified that error appears in the above numbered patent requiring correction and that the said Letters Patent should read as corrected below.

Column 10, line 34, for "engaging" read -- deflecting -- line 36, for "deflecting" read -- engaging --.

Signed and sealed this 1st day of May 1962.

(SEAL)
Attest:

ERNEST W. SWIDER
Attesting Officer

DAVID L. LADD
Commissioner of Patents